Nov. 7, 1950
J. W. CROWNOVER ET AL
2,528,498
HEARING AID AMPLIFIER
Filed Oct. 10, 1947
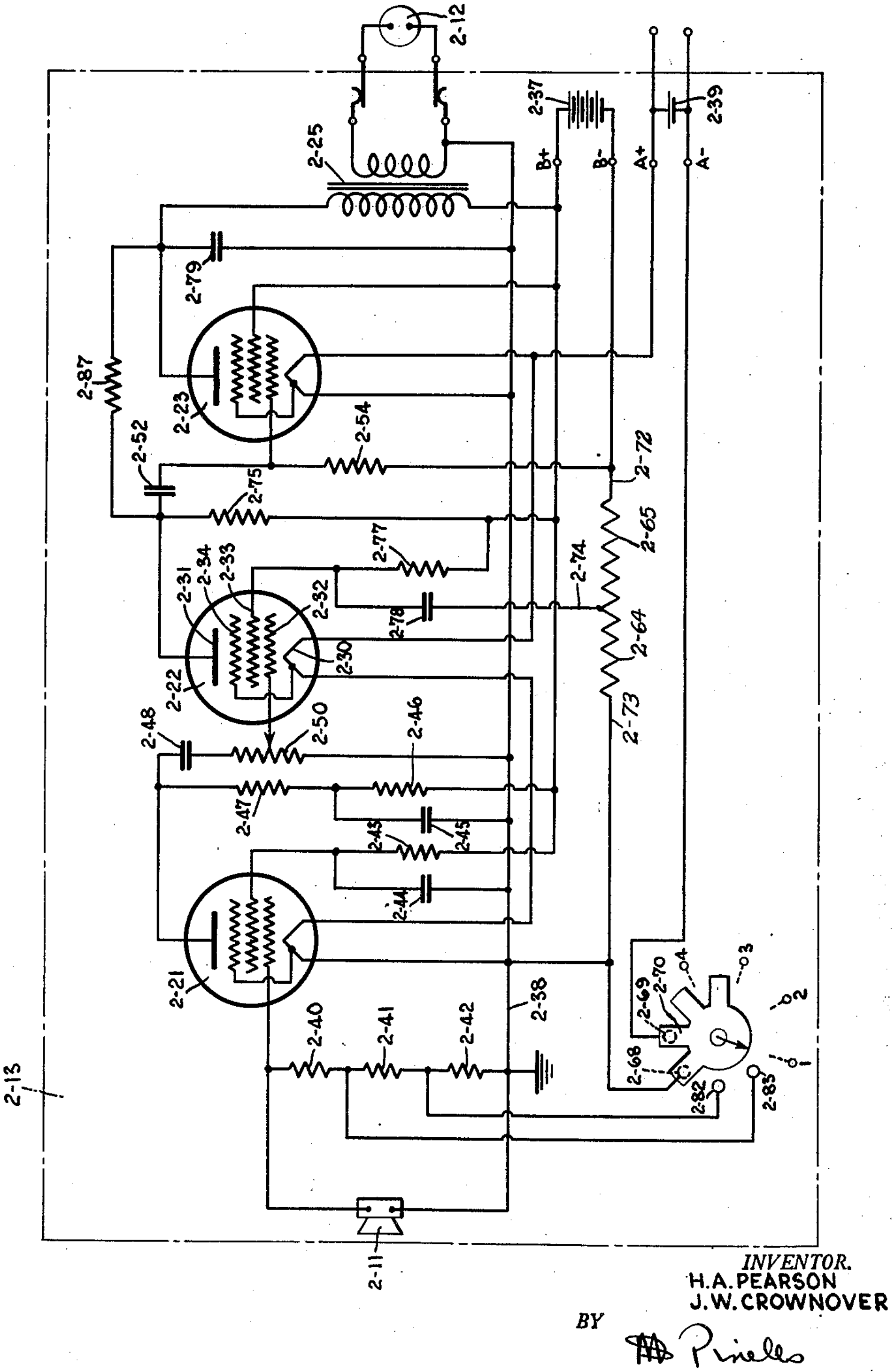
INVENTOR.
H.A.PEARSON
J.W.CROWNOVER
BY
[signature]
ATTORNEY Patented Nov. 7, 1950

2,528,498

UNITED STATES PATENT OFFICE 2,528,498

HEARING AID AMPLIFIER

Joseph W. Crownover, Hartsdale, and Harry A. Pearson, Mount Vernon, N. Y., assignors to the Sonotone Corporation, Elmsford, N. Y., a corporation of New York Application October 10, 1947, Serial No. 779,084

16 Claims. (Cl. 179—171)

This invention relates to hearing aids and more particularly to electronic amplifying hearing aids of the type which are small enough to be worn on the body of the user.

Among the objects of the invention are novel vacuum tube hearing aids comprising a microphone, at least one high gain stage of voltage amplification and a vacuum tube power output amplifier stage suitably biased for a class "A" operation together with a simple regenerative feedback arrangement compensating for the degeneration losses inherent in the bias circuit.

Further objects of the invention include hearing aids of the above type including a balancing regenerative feedback requiring no specially made components.

Still further objects of the invention include hearing aid amplifiers of the above type in which a balancing feedback arrangement is connected between points at which the signal is separated by less than two stages of amplification and phase reversal in the feedback circuit is provided by a minimum number of added components.

The foregoing and other objects of the invention will be best understood from the following description of exemplifications thereof, reference being had to the accompanying drawings, wherein:

The figure is a circuit diagram of one practical form of the hearing aid amplifier arrangement exemplifying the invention.

It is well known in the hearing aid field that the construction of vacuum tube type hearing aids incorporating a vacuum tube power amplifier stage should have this stage properly biased for class "A" operation to avoid harmonic distortion and to decrease the battery drain during operation. For the miniature type of hearing aid intended to be worn on the body of the user and occupying a minimum of space, this bias is usually obtained by providing a vacuum tube plate current supply battery the negative terminal of which is connected through a resistance to the signal return or ground line and connecting the power amplifier control grid directly to the negative terminal of this battery. By this arrangement the plate current is made to pass through the resistance producing a drop in voltage between the ends of the resistance. Inasmuch as the power amplifier vacuum tube cathode is at the ground line potential of one end of this resistance and the power amplifier vacuum tube control grid is connected to the other end of the resistance, the grid is biased with respect to the cathode by the voltage drop across this bias resistance.

Unfortunately the same plate current that generates the biasing voltage across the bias resistance also exhibits signal variations corresponding to the output signal and the bias voltage will have an added signal component of relatively small amplitude. As a result the control grid of the power amplifier will not only be biased, but will be supplied with a small signal voltage opposite in phase to the signal impressed on it by the previous stages. This degeneration decreases the amplification of the hearing aid below the maximum available from the stages.

One way to avoid the bias degeneration losses is to bridge the bias resistor with a by-pass capacitance large enough to effectively short-circuit the resistance to alternating currents. The by-pass capacitance required is quite large, of the order of a few microfarads, and necessitates quite a bulky component. Furthermore, for miniature hearing aids to be worn on the body of the user the presence of additional condensers is to be avoided. The effects of humidity and temperature are especially severe due to the proximity with the body, and the economy of dimensions including the thickness of the condenser dielectric makes them subject to more rapid deterioration and objectionably contributes to their delicateness. Condensers in general exhibit a relatively short life when used in such hearing aids and the presence of fewer likely sources of early failure makes a much more practical instrument.

According to the invention, undesirable degeneration caused by the bias resistance connections is compensated for by a simple form of regenerative feedback which does not require the use of specially designed components and which is stable in operation. A feature of the invention is a simple regenerative feedback connection from the biasing resistance to the screen grid of the immediately preceeding stage amplification whereby a very small number of added components are utilized.

The figure shows one practical form of a hearing aid amplifier exemplifying the invention. Housed in an amplifier compartment shown by the dash-dot lines 2—13 is a microphone 2—11 which may be of the piezoelectric crystal type, and an amplification arrangement including vacuum tubes 2—21, 2—22 and 2—23. Tubes 2—21 and 2—22 are connected in high gain circuits arranged to form two stages of voltage amplification through which the microphone output signals are passed. Vacuum tube 2—23 is used as a power amplifier stage for providing high levels of signal currents corresponding to the amplified signals appearing at the output connection of the final voltage amplification stage. The amplified power output is supplied to the signal reproducer 2—12 through a matching transformer 2—25 in the conventional manner. The vacuum amplifier tubes 2—21, 2—22, 2—23 are shown as of the pentode type including an electron emissive cathode 2—30 which may be of the filamentary type directly heated by passing current through it for causing emission of electrons. A plate electrode 2—31 to which may be applied a positive voltage with respect to the cathode 2—30 collects electrons emitted by it. A control grid 2—32 adjacent the cathode is connected to a source of signals to be amplified and varies the passage of electrons from the cathode 2—30 to the plate 2—31. Between the control grid and the plate a screen grid 2—33 and a suppressor grid 2—34 are mounted, the screen grid 2—33 being arranged for carrying a relatively high positive potential for improving a passage of emitted electrons to the plate 2—31, and the suppressor grid being maintained generally at cathode potential, as indicated, for retarding the movement of electrons from the plate 2—31 toward the other electrodes.

The tubes are operated by miniature batteries shown contained in the same compartment 2—13 and including a relatively high voltage plate supply or B battery, and a relatively low voltage cathode heater or A battery 2—39. The first amplification stage 2—21 is operated in a fairly conventional manner, the signal return lead or ground connection 2—38, which are common to all stages, and the tube grid being connected to the microphone output, and the grid resistance being connected across the input terminals. As shown, the grid resistance includes a chain of three resistors 2—40, 2—41 and 2—42 connected in series. The screen grid of tube 2—21 is energized by connection to the positive terminal of the B battery through a screen resistor 2—43 and is maintained substantially free of signal variations by the screen by-pass condenser 2—44. The plate of this stage is supplied from the B+ terminal through resistors 2—46, 2—47 in series, the by-pass condenser 2—45 filtering out any signal variations that might otherwise pass from the B+ terminal to the plate. The output of the first stage 2—21 is impressed through coupling condenser 2—48 on the input grid resistance 2—50 of the succeeding stage 2—22, which may be in the form of a potentiometer for adjustable control of the amplifier gain by the user of the hearing aid. The output plate loading resistor 2—75 of the second stage is coupled through coupling condenser 2—52 to the input grid resistor 2—54 of the power amplifier stage 2—23. The output of the power amplifier stage is bridged by a capacitance 2—79 which imparts desired frequency response characteristics to the hearing aid.

The plate current supply connections are completed through the cathodes of the tubes which are connected through the signal return line 2—38 and a selector switch 2—70 to the negative terminal of the plate current supply battery 2—37. The selector switch 2—70 is a multi-position switch, and as indicated by arrow 2—85 and position legends 1, 2, 3, etc., its multi-prong contact member may be rotated or moved to any one of the three positions, across a series of contacts 2—69, 2—68, 2—82 and 2—83. Contact 2—68 is a grounded terminal as shown, the others being connected to the various elements of the circuit for selectively grounding them and providing desired operation characteristics. When the selector switch 2—70 is in position 1 or the full "On" position, the A battery 2—39 is connected and supplies cathode heating currents to the cathodes of all amplifier stages. Now when the selector switch 2—70 is in position 2, it grounds and shunts the input grid resistor 2—42, and when switch 2—70 is advanced to position 3, it also grounds the input resistance 2—41, and in both positions 2 and 3 the A battery remains connected through the grounded A-lead for energizing the hearing aid. In position 4, or the "Off" position of the switch 2—70, the A-lead is disconnected from ground so that the hearing aid does not operate.

The individual input resistors 2—40, 2—41, 2—43 have their resistance adjusted so that the shunting so changes the input impedance of amplifier stage 2—21, including the grid-cathode interelectrode capacitance of tube 2—21 and the output capacitance of microphone 2—11, that the different impedances are presented to signals of different frequencies and different tonal qualities are imparted to the hearing aid. Thus, for example, the total resistance of the resistor chain may be adjusted for suitable, normal response. The resistor 2—42 may make up a large fraction of the resistance of the entire resistor chain so that its removal by shunting lowers the input impedance appreciably for low frequency signals. Correspondingly, the resistor 2—41 may have a resistance forming a large fraction of the total resistance of resistors 2—40, 2—41 for further decreasing the impedance to low frequency signals with the selector switch 2—70. This low frequency signal attenuation is exceedingly useful under conditions in which the hearing aid user is attempting to listen to voice signals in a background of high noise level. Noises are generally in the low frequency range and are substantially diminished in intensity by the shunting operations without detracting appreciably from the intelligibility of the voice signals.

It should be noted that the power tube 2—23 of the power stage is a pentode tube having a high anode or plate resistance, and when connected in the manner shown, it operates substantially as a constant current source, the current being substantially independent of the load impedance.

The negative B connection to the ground lead 2—38 is established through a biasing resistance shown as comprising resistor portions or elements 2—64, 2—65. The plate current passing through this resistance 2—64, 2—65 develops a potential difference across its ends 2—72, 2—73 of such polarity that the resistance end 2—73 is positive with respect to the resistance end 2—72. The control grid of the power tube is connected through the input grid resistance 2—54 to the negative resistance end 2—72 of the bias resistance at 2—72 while the cathode of the power amplifier stage 2—23 and the negative sides of the other elements of the amplifier are returned to the other positive resistance end 2—73 of the biasing resistance through the ground lead 2—38. Accordingly, the grid of the power amplifier tube 2—23 is maintained at a negative potential with respect to its cathode and the tube is properly biased for distortionless and low drain class "A"

operation. The output current of the power tube flows through the biasing resistance 2—64, 2—65 and develops across it an appreciable voltage drop proportional to the signal current which is impressed on the control grid of the power amplifier 2—23. This signal voltage developed across the bias resistance 2—64, 2—65 is opposite in phase to the signal impressed on the power amplifier input by the preceding amplifier stage 2—22 and has a degenerative or gain reducing effect. This is evident from the fact that when the grid of tube 2—23 becomes more positive, more electrons are caused to pass from the cathode to the plate increasing the conductivity of the tube so that more plate current passes and a higher voltage develops between ends 2—73 and 2—72 of the bias resistance. This instantaneous higher bias voltage tends to make the grid of power amplifier tube more negative with respect to its cathode appreciably diminishing the signal intensity appearing across this grid circuit and degenerating the gain of the stage. During negative excursions of the power amplifier grid less plate current flows and a lower instantaneous bias voltage tends to make the tube grid less negative or more positive with respect to its cathode also degenerating the gain of the stage.

According to the invention the bias degenerative effects are counteracted by a simple regenerative circuit for feeding back some of the bias signal in proper phase to a lower signal level point of the circuit for reinforcing and increasing the intensity of low level signals, balancing the loss of gain through the degenerative effects and providing a desired amplifier gain which may be made much closer to or even greater than the maximum obtainable from the components. As shown, a part of the degenerative bias signal taken, through lead 2—74 including capacitance 2—78, from the tap between the bias resistor portions 2—64, 2—65, is applied to the screen grid 2—33 of the immediately preceding stage of amplification. The screen grid of this tube which is maintained at a positive potential by the conventional series screen resistor 2—77 connecting it to the B+ lead is normally by-passed to ground with a capacitance so that the regenerative feedback circuit of the invention does not require the addition of an extra capacitance.

The bias resistance 2—64, 2—65 may be made either as a continuous tapped resistor or as two separate interconnected resistance elements, or may be combined with connectors, as by selecting connectors having inherent resistance sufficient to provide desired suitable circuit characteristics.

Another feature of the invention is that the regenerative feedback needs no additional phase reversing element and at the same time feeds back across less than two stages of amplification. It is well known that each amplification stage of the type described in connection with the figure causes phase reversal of the signal so that it would be expected that regenerative feedback would require a circuit interconnecting portions of the amplifier in which the signal level is spaced by two stages of amplification, or a feedback network containing additional elements for causing phase reversal of the signal as it is fed back. It is also well known that regenerative feedback is normally delicate and must be very critically arranged inasmuch as the normally large difference in signal levels at the ends of the feedback circuit make it necessary to permit only a very small portion of the high level signals to feedback if oscillation, that is, sustained and uncontrolled feedback, is to be avoided. The greater the difference in level of the feedback terminals the more critical and delicate is the arrangement.

The regenerative feedback arrangement of the invention makes it possible to obtain a compact amplifier of the type described without danger of instability and oscillations, because advantage is taken of the fact that the power output tube 2—23 is a pentode which operates substantially as a constant current source and the regenerative feedback voltage developed across the bias resistance remains substantially independent of variations of the load impedance that is in general a cause of instability of a regenerative amplifier feedback circuit.

In the arrangement of the invention, the regenerative feedback is across less than one stage, being between the control grid of the power amplifier stage and the screen grid of the immediately preceding stage. In this way, the screen grid 2—33 of stage 2—22 is supplied with a signal voltage so that it functions as a plate current controlling grid similar to, but having less gain characteristics than, control grid 2—32. The signals at the feedback tap in the bias resistance 2—64, 2—65 are opposite in phase to the signals at the input grid of stage 2—23 as well as similarly phased signals at the plate 2—31 of stage 2—22. However, since the control action of the screen grid 2—33 on the plate current of tube 2—22 results in phase reversal between the screen grid signals and the plate signals produced by the plate current control action of the screen grid, it is evident that the regenerative feedback circuit of the invention causes feedback signals to appear at the plate of tube 2—22 in phase with the signals impressed thereon through its input grid 2—32. The amplification gain of this feedback circuit is quite small being only a fraction of the total gain available from the tube 2—22 so that the feedback circuit is relatively insensitive to minor and unavoidable variations of the electrical characteristics of the regenerative feedback components and is in no way critical. The resulting hearing aid amplifier is a rugged and dependable instrument having substantially uniform characteristics.

The hearing aid constructions embodying the invention may also include a resistance 2—87 connected between the plates of tubes 2—22 and 2—23 for providing a small amount of degeneration where needed for improving the amplifier characteristics. The resistance 2—87, which may be quite large, connects points at which the signals are oppositely phased and the resulting degeneration which may be selectably varied can be applied as a control for assuring that any variation in the gain of the amplifier assembly caused by unavoidable variations of the electrical characteristics of the different components may be compensated for. Miniature hearing aid amplifiers of the type intended to be worn on the body of the user employ components, such as vacuum tubes, the elements of which are so small and closely spaced that unavoidable manufacturing variations of normally slight significance with larger sized components introduce a considerable degree of objectionable variation. The hearing aid of the invention may accordingly be made in large quantities, each individual hearing aid having substantially duplicate characteristics, in spite of such variation.

Without in any way limiting the invention and for the purpose of enabling others skilled in the art to construct and use the same, there are given below the circuit constants of a practical form of hearing aid amplifier of the invention.

| | | |
|---|---|---|
| Tube 2—22 | | Type 505 |
| Resistor 2—77 | megohms | 3.3 |
| Condenser 2—78 | microfarads | 0.01 |
| Resistor 2—75 | megohms | 2.2 |
| Condenser 2—52 | microfarads | 0.0005 |
| Resistor 2—54 | megohms | 4.7 |
| Resistor 2—64 | ohms | 470 |
| Resistor 2—65 | do | 1500 |

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

We claim:

1. In an amplifier, of a device such as a hearing aid worn on the body of the user, having a plurality of amplification stages energized by miniature electric battery elements: a power amplifier stage including a power tube having an anode, a cathode and a control electrode on which amplified signal output is impressed; a gain amplifier stage immediately preceding said power stage and including an additional tube having an anode, a cathode, a control electrode, and a screen electrode between the control electrode and anode maintained at a positive potential relative to the cathode; energy supply connections including common positive circuit portions connecting a positive terminal of said battery to the anodes of said two tubes, and negative circuit portions connecting the negative terminal of said battery to the cathodes of said tubes for supplying space current to said tubes; one of said negative circuit portions connected between the cathode of the power tube and said negative terminal constituting a resistance circuit portion including resistance elements across which a bias voltage is developed by the space current of said power tube; a biasing connection from said resistance circuit portion to the control electrode of said power tube for impressing thereon a bias voltage developed across said resistance elements and rendering it negative relative to its cathode so as to operate said power tube at a desired control-electrode bias in the absence of any other bias source, and also feeding to the control electrode of said power tube a degenerative signal voltage; and a regenerative feedback connection from said resistance circuit portion to the screen electrode of the additional tube for impressing thereon a signal voltage which is substantially in phase with the signal voltage impressed on the control electrode of said additional tube and producing thereby a regenerative amplifying action opposing the effect of said degenerating signal voltage.

2. In an amplifier, of a device such as a hearing aid worn on the body of the user, and energized by miniature electric battery elements: a power amplifier stage including a power tube having an anode, a cathode, and a control electrode on which amplified signal output is impressed; a gain amplifier stage immediately preceding said power stage and including an additional tube having an anode, a cathode, a control electrode, and a screen electrode between the control electrode and the anode maintained at a positive potential relative to the cathode; energy supply connections including common positive circuit portions connecting a positive terminal of said battery to the anodes of said two tubes, and negative circuit portions connecting the negative terminal of said battery to the cathodes of said tubes for supplying space current to said tubes; one of said negative circuit portions connected between the cathode of the power tube and said negative terminal constituting a resistance circuit portion including resistance portions across which a bias voltage is developed by the space current of said power tube; a biasing connection from said resistance circuit portion to the control electrode of said power tube for impressing thereon a bias voltage developed across said resistance portions rendering it negative relative to its cathode so as to operate said power tube at a desired control-electrode bias in the absence of any other bias source, and also feeding to the control electrode of said power tube a degenerating signal voltage; and a regenerative feedback connection including a serially connected capacitance from said resistance portions to the screen electrode of the additional tube for impressing thereon a signal voltage which is substantially in phase with the signal voltage impressed on the control electrode of said additional tube and producing thereby a regenerative amplifying action opposing the effect of said degenerating signal voltage.

3. In an amplifier of a device, such as a hearing aid or a radio receiver, worn on the body of the user, having a plurality of amplification stages energized by miniature electric battery elements: a gain amplifying stage comprising a gain tube having an anode, a cathode, a control electrode, and an additional gain controlling electrode between the control electrode and the anode maintained at a positive potential relative to the cathode; a power amplifying stage including a power tube supplying a load and having an anode, a cathode, and a control electrode connected to the signal output side of said gain stage; energizing connections including common positive circuit portions and negative circuit portions connecting said anodes and said cathodes to positive and negative terminals of said battery, respectively, for supplying space current to said tubes; one of said negative circuit portions connected between the cathode of the power tube and the negative terminal of said battery constituting a resistance circuit portion including bias resistance elements across which a bias voltage is developed by the space current of said power tube; a biasing circuit portion connecting a portion of said resistance elements to the control electrode of said power tube for impressing thereon a bias voltage developed across said resistance elements and rendering it negative relative to its cathode so as to operate said power tube at a desired bias in the absence of any other bias source, and also feeding to the control electrode of said power tube a degenerating signal voltage; and a regenerative feedback circuit portion connecting a portion of said bias resistance elements to said gain controlling electrode of said gain tube other than its control electrode for impressing thereon a signal which is substantially in phase with the signal impressed on its control electrode and producing in said additional tube a regenerative amplifying action opposing the effect of said degenerating signal voltage.

4. In an amplifier as claimed in claim 3, in which the regenerative feedback circuit portion connects a portion of the bias resistance elements to the screen electrode of the gain tube.

5. In an amplifier as claimed in claim 3, in which the bias resistance portion is made of a single resistor having an intermediate tap to which said regenerative circuit portion is connected.

6. In an amplifier as claimed in claim 3, in which the power amplifying stage is a pentode, electrodes of which are connected to the battery elements for causing it to operate substantially as a constant current source, whereby the regenerative voltage component developed across the bias resistance elements is substantially independent of variations in the load impedance.

7. In an amplifier as claimed in claim 6, in which the regenerative feedback circuit portion connects a portion of the bias resistance elements to the screen electrode of the gain tube.

8. In an amplifier as claimed in claim 7, in which the bias resistance portion is made of a single resistor having an intermediate tap to which said regenerative circuit portion is connected.

9. An amplifier as claimed in claim 1, in which a common negative circuit portion, including the resistance elements across which the bias voltage is developed, is connected between the negative terminal of said battery and the cathodes of the power tube and the preceding additional tube.

10. An amplifier as claimed in claim 2, in which a common negative circuit portion, including the resistance elements across which the bias voltage is developed, is connected between the negative terminal of said battery and the cathodes of the power tube and the preceding additional tube.

11. An amplifier as claimed in claim 3, in which a common negative circuit portion, including the resistance elements across which the bias voltage is developed, is connected between the negative terminal of said battery and the cathodes of the power tube and the preceding gain tube.

12. An amplifier as claimed in claim 11, in which the regenerative feedback circuit portion connects a portion of the bias resistance elements to the screen electrode of the gain tube.

13. An amplifier as claimed in claim 12, in which the bias resistance elements are made of a single resistor having an intermediate tap to which said regenerative circuit portion is connected.

14. An amplifier as claimed in claim 3, in which a common negative circuit portion, including the resistance elements across which the bias voltage is developed, is connected between the negative terminal of said battery and the cathodes of the power tube and the preceding gain tube, and in which the power amplifying stage is a pentode, electrodes of which are connected to the battery elements for causing it to operate substantially as a constant current source, whereby the regenerative voltage component developed across the bias resistance elements is substantially independent of variations in the load impedance.

15. An amplifier as claimed in claim 14, in which the regenerative feedback circuit portion connects a portion of the resistance elements to the screen electrode of the gain tube.

16. An amplifier as claimed in claim 15, in which the bias resistance elements are made of a single resistor having an intermediate tap to which said regenerative circuit portion is connected.

JOSEPH W. CROWNOVER.
HARRY A. PEARSON.

REFERENCES CITED

The following references are of record in the file of this patent:

UNITED STATES PATENTS

| Number | Name | Date |
|---|---|---|
| 1,692,904 | Potter | Nov. 27, 1928 |
| 2,026,944 | Knight | Jan. 7, 1936 |
| 2,065,610 | Paris | Dec. 29, 1936 |
| 2,345,761 | Lybarger | Apr. 4, 1944 |